H. HARMER,
Assignor to F. BROUGHTON.
SAFETY SWITCH GUARD.
No. 10,478. Reissued May 13, 1884.
Fig. 1.
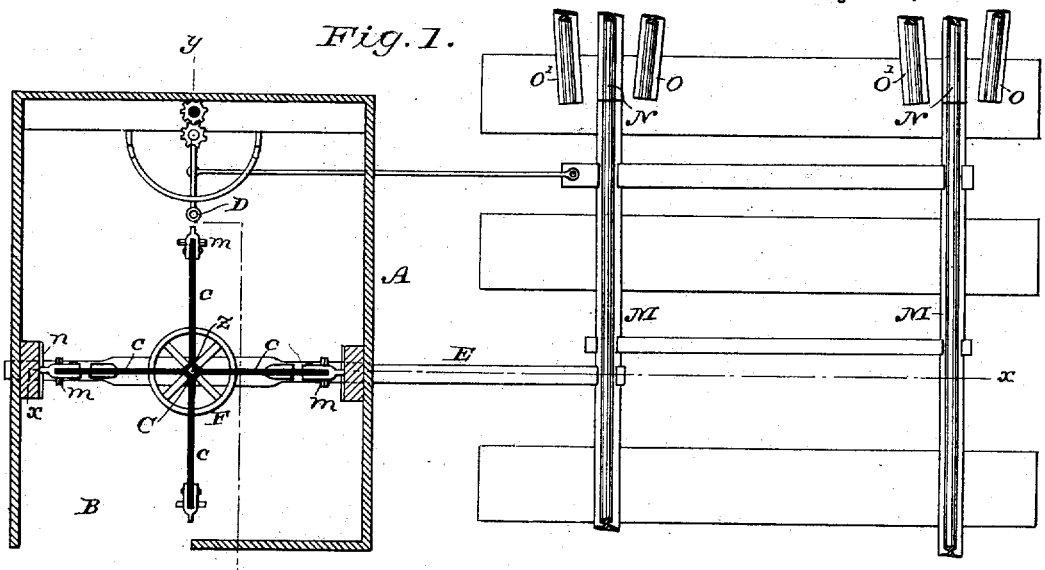
Fig. 3.
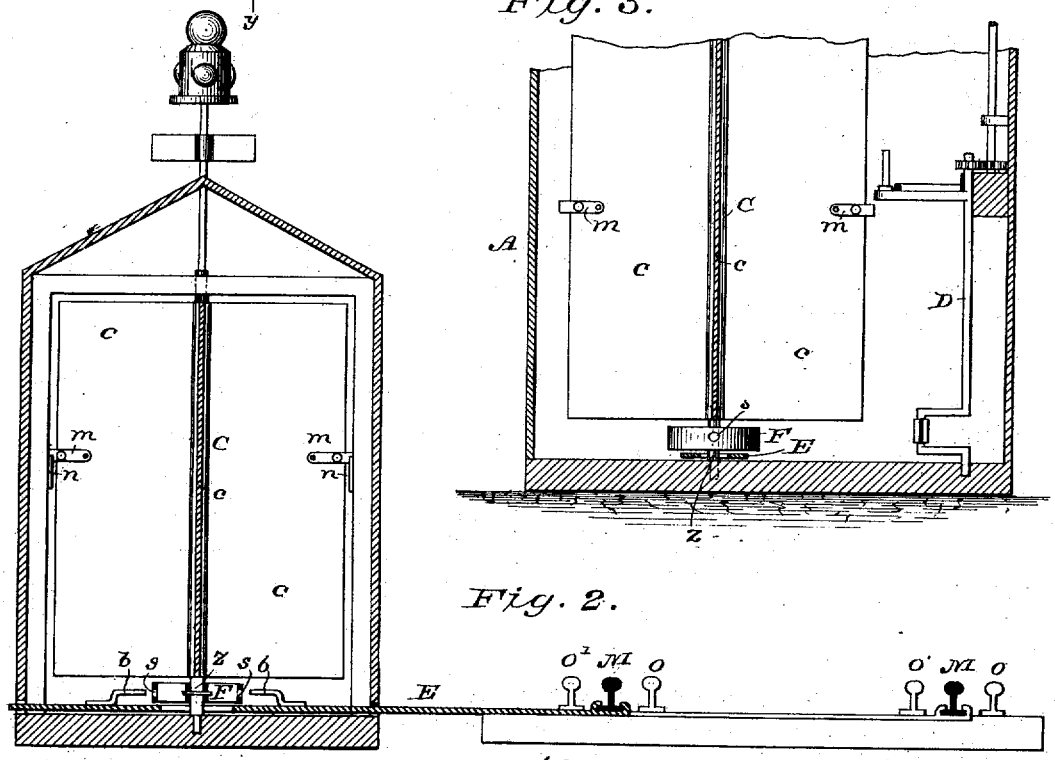
Fig. 2.
WITNESSES
Polly Harmer
L. S. Mich.
Henry Harmer INVENTOR
N. PETERS, Photo-Lithographer, Washington, D. C.

UNITED STATES PATENT OFFICE.

HENRY HARMER, OF SOUTHAMPTON, ASSIGNOR TO FREDERICK BROUGHTON, OF HAMILTON, ONTARIO, CANADA.

SAFETY-SWITCH GUARD.

SPECIFICATION forming part of Reissued Letters Patent No. 10,478, dated May 13, 1884.

Original No. 289,254, dated November 27, 1883. Application for reissue filed April 18, 1884. Patented in Canada August 22, 1874, No. 3,770; extended August 29, 1879, No. 10,375.

*To all whom it may concern:*

Be it known that I, HENRY HARMER, of Southampton, in the county of Bruce, Province of Ontario, and Dominion of Canada, have invented certain new and useful Improvements in Safety-Switch Guards, of which the following is a full, clear, and exact description.

This invention relates to devices for preventing accidents to railroad-trains by reason of the switches on the line being improperly left open, and in which the switch-operating mechanism is contained within a house or structure into which the switchman is compelled to enter in order to adjust the switch, and from which egress is automatically controlled by the movement of the switch or throw rails in such manner that the switchman or operator cannot leave the house or structure until, after having connected a switch with a siding, he has reconnected it with the main line; and the invention consists in a new and useful combination or combinations of means for accomplishing this end, whereby great simplicity and efficiency are obtained.

In carrying out my invention, I provide a house or structure within which is located the switch-operating mechanism, and into which the switchman is compelled to enter whenever he desires to shift the switch-rails. The egress of the switchman from the house so long as the switch is out of alignment with the main line is prevented by an independent rotating turnstile, which controls the doorway or entrance to the house or structure, and which is carried by a vertical shaft suitably located in the structure. At or near the bottom of this shaft, and revolving with it, is a hub or wheel containing sockets or holes corresponding in position to the cross-wings or doors of the turnstile above. Connected with the switch is a slide-bar, which is worked by the switch, and which enters one of the sockets in the hub or wheel when the switch or throw rails are moved out of alignment with the main-line rails, and which is only drawn from it when the switch is reconnected with the main line. So long as said slide-bar remains in the socket of the wheel or hub said wheel or hub, the shaft, and the turnstile are immovable. When, however, the slide-bar is withdrawn, which can only be done by reconnecting it with the main line, then the wheel-shaft and turnstile are at liberty to revolve, thereby permitting ingress and egress to and from the house or structure, in which position of the switch-rails it will be seen that the turnstile is entirely independent of all other mechanism whatever, and never has to be rotated or turned by the switchman in the act of shifting the switch-rails. This is a great advantage, since no more power is required to operate the switch-rails than if the turnstile was not employed.

Reference is to be had to the accompanying drawings, forming part of this specification, in which similar letters of reference indicate corresponding parts in all the figures.

Figure 1 is a horizontal section of the apparatus, shown as applied to controlling a switch; also exhibiting, in part, the rails of the main line and the rails of the duplicate sidings, with and from which the switch-rails are made to connect and disconnect. Fig. 2 is a vertical section of the same upon the line *x x* in Fig. 1; and Fig. 3, a further vertical section, in part, upon the irregular line *y y* in Fig. 1.

A is the house or structure inclosing the switch-operating mechanism, and which need not exceed in horizontal dimensions six feet by four feet six inches, or thereabout.

B is the entrance to the house, and C the turnstile within the same, by which ingress and egress are automatically controlled through the operation of the switch, said turnstile having the requisite number of wings or doors *c c*, and revolving in connection with the vertical shaft Z, which carries it, and on the lower portion of which is the locking hub or wheel F.

E is the slide-bar, worked by the switch-operating mechanism, which in the present case is shown to be the ordinary crank or lever D, and which bar is disconnected from the wheel F when the switch M M is in connection with the rails N N of the main line, thus allowing the wheel F, shaft Z, and turnstile C to revolve freely, and consequently afford free ingress and egress for the switchman. To secure the operation of the slide-bar E by the switch-operating mechanism D, both of said devices are directly but separately connected with the switch.

*s s* are sockets or holes in the wheel or hub F, into which one or the other of two bolts or fixed arms *b b* on the slide-bar E enters when the switch is connected with the siding-rails O or O′. The wheel F, shaft Z, and turnstile C are then immovable, and egress from the house is, by the position of the wings or doors *c c*, impossible, and remains so until the slide-bar E, is withdrawn from the socket or hole *s* in the wheel F, which can only be done by disconnecting the switch from the siding and reconnecting it with the main line, as shown in Fig. 2. Applied to the turnstile—as, for instance, to each of its wings or doors *c*—is a drop or spring catch or fastening, *m*, which automatically engages with a keeper, *n*, in the house to hold the turnstile in position as it is revolved to insure one of the holes or sockets *s* in the wheel F coming and remaining opposite the slide-bar E or bolt *b* thereon, for engagement of said bar with said hub or wheel. The application of the thumb to said catch, or to a latch controlling the same, serves to release the catch when required.

A great advantage in the foregoing construction over devices of this general character, as heretofore known, is the absence of any connecting devices between the switch-operating mechanism and the turnstile, which would necessitate the rotation or vibration of said turnstile every time the switch-rails were moved, and this is a very important feature, since where there is such connection, should the turnstile from any cause become inoperative, the switch could not be moved.

Of course it is understood that the sector, against which the operating-lever moves, is provided with securing-notches to retain said lever in place, to prevent the accidental shifting of the switch-rails, and that any approved locking mechanism can be employed to secure the switch-actuating mechanism in place.

Any approved signal devices may be arranged upon a shaft which is actuated by the switch-lever, as is clearly illustrated in the different figures.

Having thus fully described my invention, what I claim as new, and desire to secure by Letters Patent, is—

1. In a safety-switch guard, the combination, with an independently-rotating turnstile and a switch box or house, of locking mechanism actuated by the movement of the switch or throw rails, to control said turnstile, all substantially as shown and described.

2. In a safety-switch guard, the combination, with a box or house containing switch-operating mechanism and an independently-rotating turnstile, of locking mechanism actuated by the movement of the switch-rails, whereby to control the turnstile, so as to prevent the egress of the switchman until the switch has been placed in line with the main-line rails, all substantially as shown and described.

3. In a safety-switch guard, an independently-rotating turnstile having a locking-disk or hub, a switch box or house containing switch-operating mechanism and locking mechanism actuated by the movement of the switch-rails, to lock or unlock said turnstile, the several parts being combined to operate substantially as and for the purpose set forth.

4. The combination, with the switch and its operating mechanism, of the house A, the turnstile C, with its shaft Z and attached locking hub or wheel F, and the slide-bar E, connected with the switch, and arranged to engage with said wheel or hub when the switch is open or in connection with the siding, substantially as specified.

5. In a safety-switch guard, the combination with the switch and its operating mechanism, house A, turnstile C, shaft Z, locking wheel or hub F, and engaging slide-bar E, connected with the switch, of the automatically-engaging catches or fastenings *m*, and one or more keepers, *n*, arranged to hold the turnstile in locked position with the slide-bar, substantially as herein described.

HENRY HARMER.

Witnesses:
J. S. WINBE,
KOLBY HARMER.